United States Patent
Murabe et al.

(10) Patent No.: US 6,428,211 B1
(45) Date of Patent: Aug. 6, 2002

(54) HYDRODYNAMIC GAS BEARING STRUCTURE

(75) Inventors: Kaoru Murabe; Osamu Komura, both of Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/423,203

(22) PCT Filed: Mar. 10, 1999

(86) PCT No.: PCT/JP99/01138

§ 371 (c)(1),
(2), (4) Date: Oct. 25, 1999

(87) PCT Pub. No.: WO99/46516

PCT Pub. Date: Sep. 16, 1999

(30) Foreign Application Priority Data

Mar. 10, 1998 (JP) .............................................. 10-058408

(51) Int. Cl.⁷ ............................................... F16C 32/06
(52) U.S. Cl. ......................... 384/114; 384/115; 384/118
(58) Field of Search ................................. 384/114, 115, 384/118, 119, 111

(56) References Cited

U.S. PATENT DOCUMENTS

| | | |
|---|---|---|
| 4,512,626 A | 4/1985 | Kamiya et al. |
| 5,628,567 A | 5/1997 | Murabe et al. |
| 5,731,831 A | 3/1998 | Murabe et al. |
| 5,944,427 A | 8/1999 | Murabe et al. |

FOREIGN PATENT DOCUMENTS

| | | |
|---|---|---|
| EP | 0732516 | 9/1996 |
| EP | 0837257 | 4/1998 |
| GB | 2316453 | 2/1998 |
| JP | 54-127044 | 9/1979 |
| JP | 58-16428 | 2/1983 |
| JP | 58163818 | 9/1983 |
| JP | 58-224324 | 12/1983 |
| JP | 61201916 | 9/1986 |
| JP | 01200320 | 8/1989 |
| JP | 02093115 | 4/1990 |
| JP | 03204411 | 9/1991 |
| JP | 07230056 | 8/1995 |
| JP | 07301238 | 11/1995 |
| JP | 8-312639 | 11/1996 |
| JP | 09014257 | 1/1997 |
| JP | 09144749 | 6/1997 |
| JP | 09264317 | 10/1997 |
| WO | WO97/41362 | 11/1997 |

OTHER PUBLICATIONS

Atsunobu Mori, "About Whirling of Gas Bearing", in "Lubrication" vol. 20, No. 7 (1975) pp. 481–488, with partial English Translation.

An article entitled "Gas Bearing", by Shinichi Tohgo; published by Kyoritsu Shuppan (1984) (with a Partial English Translation), pp. 4 to 7).

*Primary Examiner*—Lenard A. Footland
(74) *Attorney, Agent, or Firm*—W. F. Fasse; W. G. Fasse

(57) ABSTRACT

A hydrodynamic gas bearing structure includes a columnar shaft body (1) and a hollow cylindrical bearing body (2) arranged opposing the shaft body (1) with a space (3) maintained in the radial direction therebetween. In a cross section perpendicular to the central axis of the shaft body (1) and the bearing body (2), either the shaft body (1) or the bearing body (2) has a convex polygonal shape with at least ten vertexes. Accordingly, a hydrodynamic gas bearing structure can be obtained in which ½ whirl can be suppressed even at a high speed rotation of 20,000 rpm or higher and run out associated with the rotation can be suppressed.

19 Claims, 10 Drawing Sheets

HYDRODYNAMIC GAS BEARING STRUCTURE

TECHNICAL FIELD

The present invention relates to a hydrodynamic gas bearing structure and, more specifically, to a hydrodynamic gas bearing structure supporting a rotator rotating at a high speed.

BACKGROUND ART

Recently, as storage capacity has been increased and access time has been reduced in a rotation driving part of a magnetic recording apparatus, for example, a hard disc drive (hereinafter referred to as "HDD"), corresponding high rotational speed and high rotational accuracy have been required of a spindle motor for driving the HDD. In order to rotate a precision motor of which such a high rotational speed and high rotational accuracy are required at high speed, use of an air bearing (hydrodynamic gas bearing) in the rotation driving part has been proposed.

In the rotation driving part employing the air bearing, when the rotator rotates, air is forced into a space at least between a radial gas bearing body and the rotator. Accordingly, air pressure in the space increases, and the rotator rotates at high speed with air bearing interposed. In this manner, by the use of the air bearing, it is expected that rotational accuracy is maintained even during high speed rotation.

Generally, self-induced vibration associated with an air film resulting from dynamic pressure effect, referred to as ½ whirl, generates in the hydrodynamic gas bearing, which causes seizure of the bearing. In order to solve this problem, a technique has been proposed in which a herringbone shaped groove is formed in the shaft body or the bearing body to improve load capacity and stability, as described, for example, in *Gas Bearing* by Shinichi Tohgo, Kyoritsu Shuppan (1984). Further, a technique has been proposed in which a space varying portion is provided in the bearing as disclosed in Japanese Patent Laying-Open No. 8-312639.

The hydrodynamic gas bearing adjusted in the above described manner, however, has the following problems.

For example, Japanese Patent Laying-Open No. 8-312639 describes that a bearing free from generation of ½ whirl and having superior rotational characteristic can be obtained by providing a space varying portion in the space formed between the shaft body and the bearing body and by setting out-of-roundness (concave and convex deviation with respect to mean diameter) of the shaft body and the bearing body with respect to respective diameters to at most $3 \times 10^{-4}$.

In the actual manufacturing, especially in internal processing of a hollow cylindrical body, however, when finishing process is performed by honing or inner periphery grinding using a grinder, and a motor incorporating the thus processed bearing is rotated, run out occurs, presenting practical problem.

DISCLOSURE OF THE INVENTION

An object of the present invention is to provide a hydrodynamic gas bearing structure suitable for actual use, capable of maintaining high rotational accuracy at a high speed rotation and suppressing run out associated with rotation.

As a result of intensive study of the hydrodynamic gas bearing structure, the inventors have found that when cross sectional shape of sliding surface of the shaft body and the bearing body has a prescribed convex polygonal shape, ½ whirl does not generate even at the speed of rotation of 20,000 rpm or higher and run out can be suppressed.

Therefore, the hydrodynamic gas bearing structure in accordance with the present invention includes a columnar shaft body and a hollow cylindrical bearing body opposing to the shaft body with a radial space kept therebetween, and the structure has the following features. When the shaft body and the bearing body are arranged so that central axes thereof are aligned, an approximately cylindrical space is formed by the outer peripheral surface of the shaft body and the inner peripheral surface of the bearing body. In a cross sectional shape perpendicular or orthogonal to the axis of the shaft body and the bearing body, either the shaft body or the bearing body has a convex polygonal shape, with the convex polygonal shape having ten or more vertexes.

Thus, run out can be suppressed as compared with the prior art, and therefore the present invention can be applied without any practical problem to applications requiring high speed of rotation and high rotational accuracy.

Further, symmetry of the space with respect to the radius can be improved, attaining symmetrical pressure distribution in the space. Accordingly, a lubrication film derived from dynamic pressure effect is formed sufficiently, whereby direct contact between the shaft body and the bearing body is prevented, and hence seizure can be prevented.

When the hydrodynamic gas bearing structure has a structure as described above and the ratio of the out-of-roundness of the shaft body and the bearing body with respect to the diameter is at most $1 \times 10^{-4}$, symmetry of the space with respect to the radial direction can further be improved when the shaft body and the bearing body are arranged concentrically, and the fluid flow in the space is averaged. Accordingly, symmetry of pressure distribution in the space can further be improved, suppressing local variation in pressure. Therefore, insufficient lubrication caused by uneven pressure in the space can be suppressed and hence run out is reduced.

The inventors have further found that when the hydrodynamic gas bearing structure has the above described structure and a space enlarging portion for enlarging the space is provided on at least one of the shaft body and the bearing body, it becomes possible to suppress ½ whirl and to improve rotational accuracy even at a high speed rotation with the speed of 20,000 rpm or higher.

Therefore, in a preferred aspect of the present invention, at least one space enlarging portion is provided extending in the axial direction, for enlarging the space, in at least one of the shaft body and the bearing body.

The amount of enlargement of the space at the space enlarging portion is preferably at least 0.2 and at most 1 times the thickness of the space other than the space enlarging portion (hereinafter referred to as average gap). When the amount of enlargement of the space at the space enlarging portion is defined in this manner, suppression of ½ whirl and improvement of rotational accuracy at high speed rotation can more effectively be attained.

The inventors have found that in another preferred aspect of the present invention, at least one axial end of the space enlarging portion is formed from a region where the shaft body and the bearing body oppose to each other to a region where the shaft body and the bearing body do not oppose to each other. Thus, supply of fluid from outside the bearing to the space of the bearing is facilitated, the supporting force of the fluid film is secured by the effect of the space enlarging portion, and local variation of pressure can be suppressed by the effect of the convex polygonal space, whereby ½ whirl generated at a high speed rotation of 20,000 rpm or higher can be suppressed and run out in synchronization with the rotation can be reduced.

According to another preferred aspect of the present invention, one of the shaft body and the bearing body has a plurality of space enlarging portions, and the plurality of space enlarging portions are arranged at equal distance from each other in cross section. Thus, the above described effect of symmetry in the peripheral direction realized by the provision of the space enlarging portions is further enhanced.

According to another preferred aspect of the present invention, the space enlarging portion is stationary or rotational with respect to an external stationary system. Thus, the space enlarging portion provides the above described effect no matter whether it is placed on the rotational side or stationary side.

In accordance with a still further preferred aspect of the present invention, with respect to the gas flow in the peripheral direction of the space, space variation ratio on the gas inlet side of the space enlarging portion is larger than the space variation ratio on the gas outlet side. Accordingly, the efficiency of dynamic pressure generation is improved, and hence run out can be reduced.

In another preferred aspect of the present invention, the ratio of the space variation ratio on the inlet side with respect to the space variation ratio on the outlet side is smaller than 10. Thus, run out can further be suppressed.

According to another preferred aspect of the present invention, the space enlarging portion has a large space portion where the amount of enlargement of the space is relatively large, and a small space portion where the amount of enlargement of the space is relatively small. The large space portion is positioned on the gas inlet side of the space enlarging portion, and the small space portion is arranged on the gas outlet side, with respect to the gas flow in the peripheral direction of the space. Thus, the efficiency in generating dynamic pressure in the space enlarging portion is enhanced, and therefore run out can further be suppressed.

In another preferred aspect of the present invention, the ratio of the amount of enlargement of the space of the large space portion with respect to the amount of enlargement of the space in the small space portion is at most 20. Thus, run out can further be suppressed.

In another preferred aspect of the present invention, the space variation ratio on the inlet side of the large space portion is larger than the space variation ratio at the outlet side of the small space portion. Thus, efficiency in generating dynamic pressure can be improved, and hence run out can be reduced.

In another preferred aspect of the present invention, the ratio of the space variation ratio at the inlet side of the large space portion with respect to the space variation ratio at the outlet side of the small space portion is smaller than 10. Thus run out can further be suppressed.

In another preferred aspect of the present invention, the ratio of the amount of enlargement of the space at the large space portion with respect to the amount of enlargement of the space at the small space portion is at most 20. Thus, run out can further be suppressed.

In another preferred aspect of the present invention, the length in the axial direction of the space enlarging portion is at least ⅓ of the length in the axial direction of the region where the outer peripheral surface of the shaft body opposes to the inner peripheral surface of the bearing body. Thus, it becomes possible to prevent abnormal vibration at a high rotation area, and to suppress direct sliding at the time of starting and stopping rotation to a lower number of rotation. Accordingly, a bearing structure and a motor having long life reliability can be obtained.

More preferably, the length in the axial direction of the space enlarging portion is at most ⅔ of the length in the axial direction of the region where the outer peripheral surface of the shaft body opposes to the inner peripheral surface of the bearing body. Thus, the effect described above can further be enhanced.

BEST MODE FOR CARRYING OUT THE INVENTION

Embodiments of the present invention will be described in the following.

Figure 1:
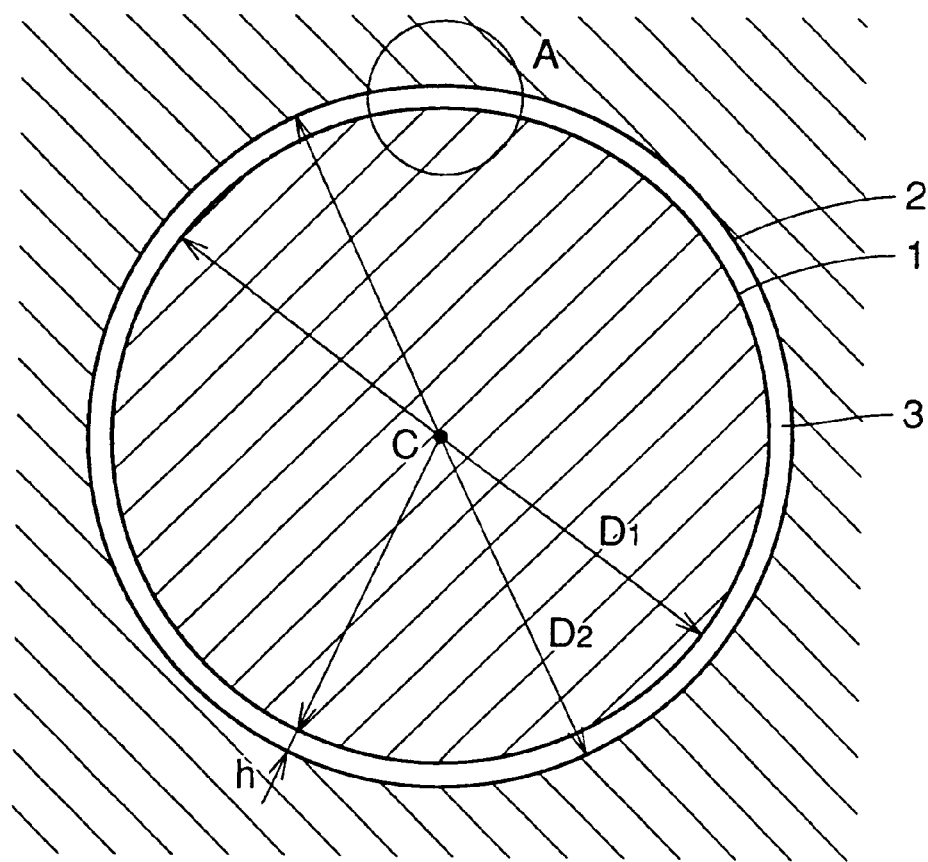
FIG. 1 is a cross section representing the hydrodynamic gas bearing structure in accordance with an embodiment of the present invention.

FIG. 1 is a cross section representing the shaft body and the bearing body of the hydrodynamic gas bearing in accordance with one embodiment of the present invention.

Referring to FIG. 1, the hydrodynamic gas bearing in accordance with the present embodiment has an approximately cylindrical shaft body 1, and a hollow cylindrical bearing body 2 opposing to the shaft 1 with a radial space 3 kept therebetween. When shaft body 1 and bearing body 2 are arranged with the central axes C aligned, an approximately cylindrical space (hereinafter also referred to as bearing space) 3 is formed at a region where outer peripheral surface of shaft body 1 and inner peripheral surface of bearing body 2 oppose to each other.

Figure 16A:
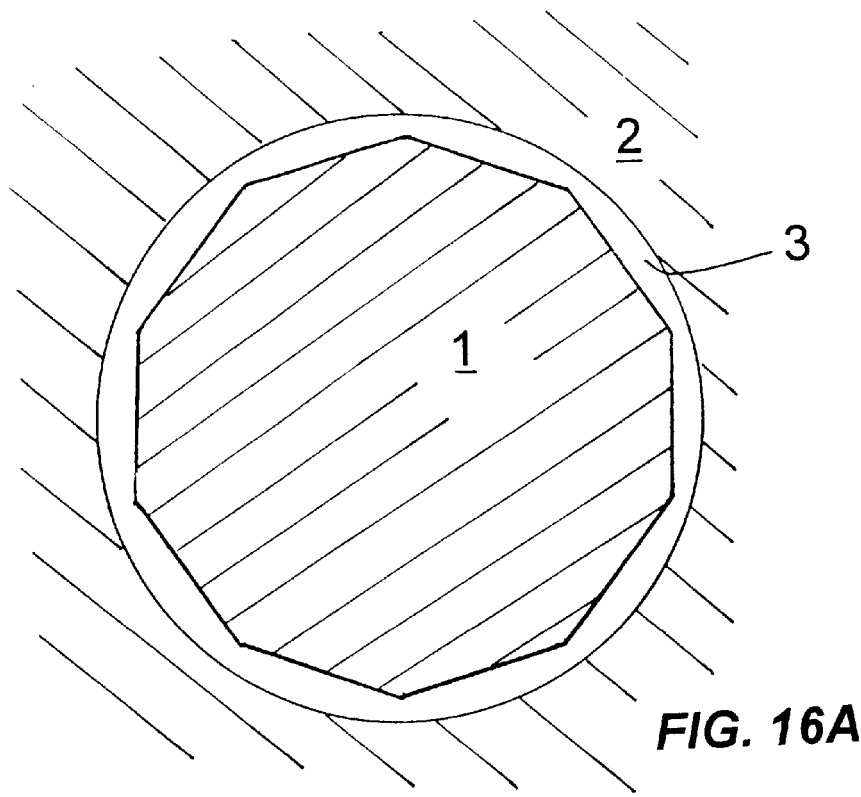
FIGS. 16A and 16B illustrate the convex polygonal shape of the shaft body and of the bearing body respectively.
Figure 16B:
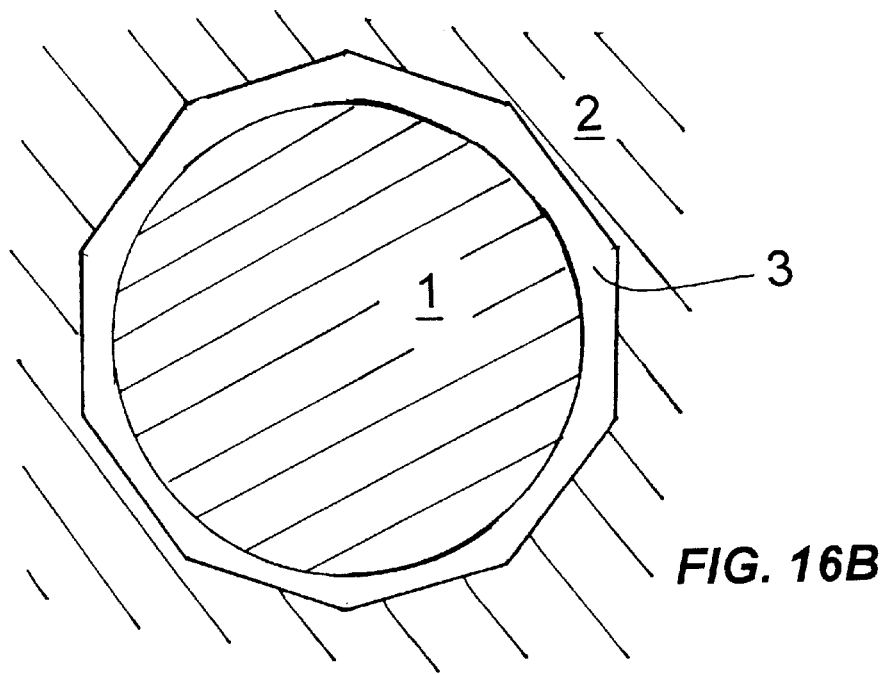

In the hydrodynamic gas bearing structure shown in FIG. 1, cross sectional shape providing a sliding surface of either shaft body 1 or bearing body 2 has convex polygonal cross sectional shape, with the convex polygon having at least ten vertexes. In FIG. 1, the true convex polygonal shape having at least ten vertexes has been schematically simplified to be illustrated as a circle. See FIGS. 16A and 16B for a more accurate representation of the true shape.

Figure 2:
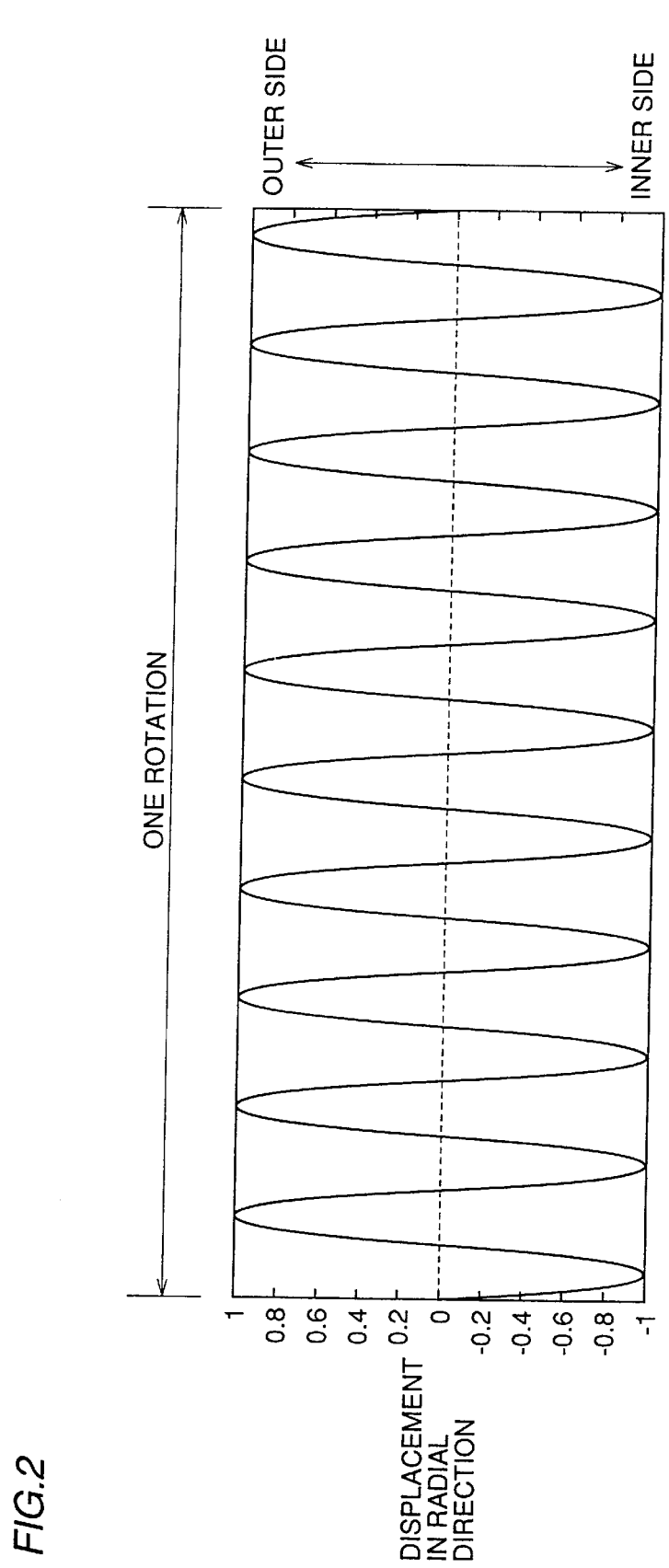
FIG. 2 is an illustration representing the shape of a bearing surface of a rotational member in the hydrodynamic gas bearing structure in accordance with one embodiment of the present invention.

Here, the number of vertexes represent the number of variation patterns which can be regarded approximately as sine curves such as shown in FIG. 2, when displacement in radial direction of the sliding surface is measured by an out-of-roundness measuring apparatus, a laser non-contact type displacement gauge or the like. The convex polygon refers to a polygon of which every internal angle is smaller than two right angles, i.e. smaller than 180°.

When displacement in the radial direction of the sliding surface is measured by the above described method and the number of variation patterns which can be regarded as approximately continuous sine curves is not larger than 2 or not smaller than 50 and out-of-roundness is at most $3 \times 10^{-4}$ with respect to the diameter, the cross sectional shape is regarded as a perfect circle.

Figure 3:
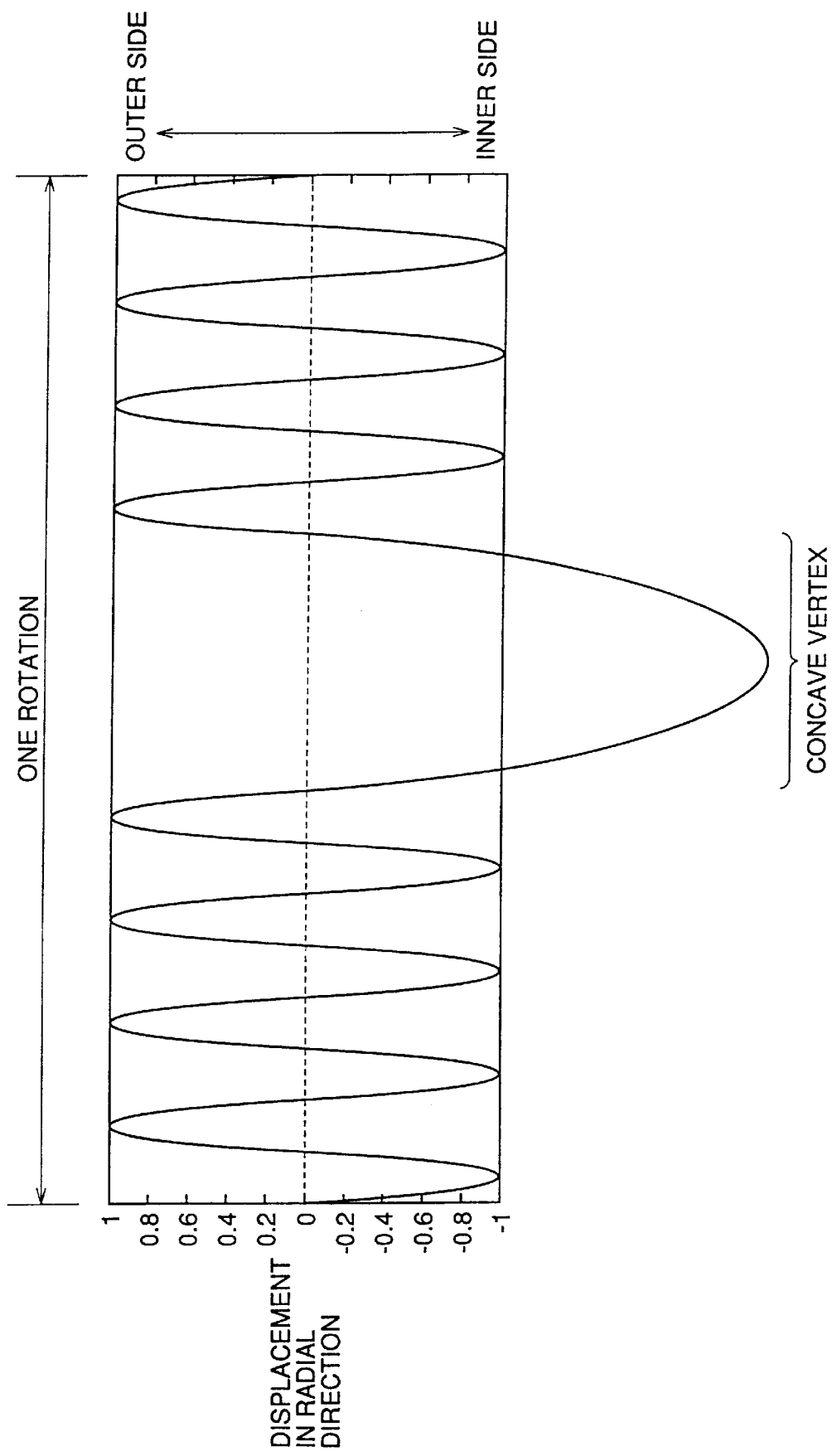
FIG. 3 is an illustration of a shape of a bearing surface of the rotational member having concave polygonal cross section.

When a part of the continuous sine curve has its phase inverted as shown in FIG. 3, the cross section is regarded as a concave polygon.

When cross sectional shapes of shaft body 1 and bearing body 2 are both perfect circle, ½ whirl generates at high speed rotation, and sliding surfaces are brought into direct contact at high speed, resulting in seizure. Therefore, the cross sectional shape of the sliding surface of either the shaft body 1 or the bearing body 2 is adapted to have the convex polygonal shape, whereby a portion where space 3 varies, which is the cause of pressure distribution, can be formed. This makes it possible to suppress ½ whirl even at a high speed rotation of 10,000 rpm or higher.

When the polygon has such a shape in that internal angle at a vertex exceeds 180°, geometric uniformity of space 3 is lost. This results in uneven generation of dynamic pressure, causing large run out.

When the number of vertexes of the convex polygon is not smaller than ten, pressure distribution which depends on the cross sectional shape of the rotating side sliding surface can be made uniform, by the averaging function of the fluid flow in the space. Thus, imbalance in supporting force of the fluid film or the like is prevented, and it becomes possible to avoid generation of ½ whirl substantially at 20,000 rpm or higher, and further, it becomes possible to reduce run out. In that case, the out-of-roundness should also be set to at most $1 \times 10^{-4}$ with respect to the diameter ($D_1$ or $D_2$ of FIG. 1).

Figure 4:
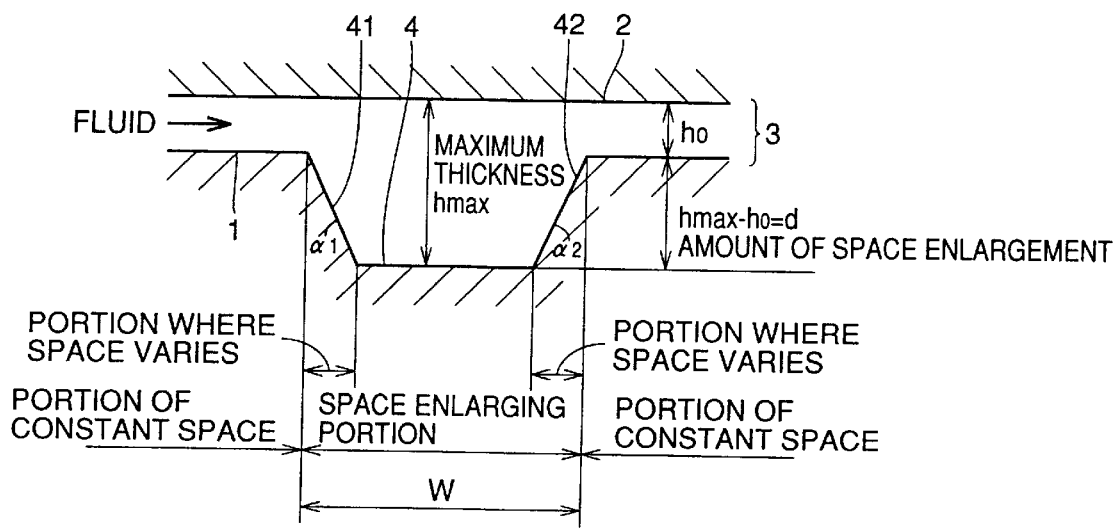
FIG. 4 is a detailed illustration showing, in enlargement, the portion A of FIG. 1.
Figure 5:
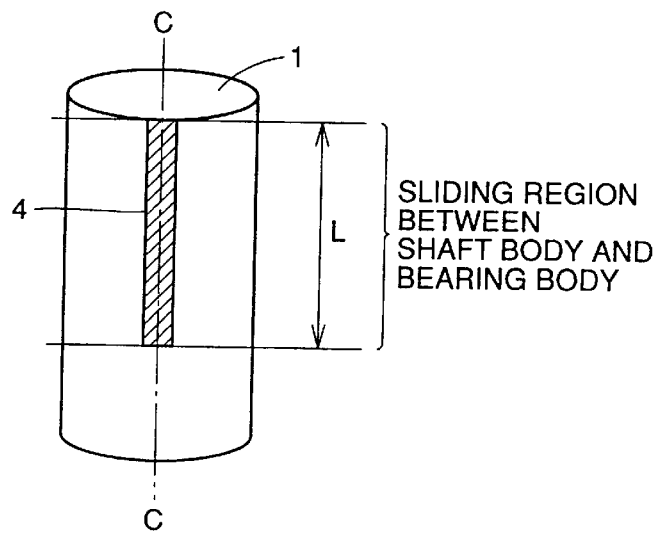
FIG. 5 shows a structure when the space enlarging portion is provided parallel to the axial direction.

In order to prevent ½ whirl at 20,000 rpm or higher, a space enlarging portion 4 such as shown in FIG. 4 may be provided extending in the axial direction of shaft body 1, as shown in FIG. 5.

In this case, preferably, at least one end of space enlarging portion 4 communicates from the bearing space 3 (sliding region between shaft body 1 and bearing body 2) to the outside thereof. Though ½ whirl can be prevented by the effect of space enlarging portion 4, air as working fluid is not sufficiently supplied to bearing space 3 unless one end of space enlarging portion 4 is communicated to the outside, and in that case, dynamic pressure effect is reduced, causing run out.

When the shape of at least one member of shaft body 1 and bearing body 2 at a portion forming the average space is adapted to a convex polygon having at least ten vertexes, as described above, dynamic pressure effect derived from eccentricity of the average space portion itself is remarkably higher than when both members have perfectly circular cross sections. Therefore, by the synergistic effect of the thus provided dynamic pressure effect and the dynamic pressure effect provided by the space enlarging portion 4, run out can further be suppressed.

FIG. 4 shows details of the portion A of FIG. 1, and FIG. 5 shows a structure when the space enlarging portion is provided on the shaft body, for example. Space enlarging portion 4 may be provided not on shaft body 1 but on the bearing body 2.

Figure 6:
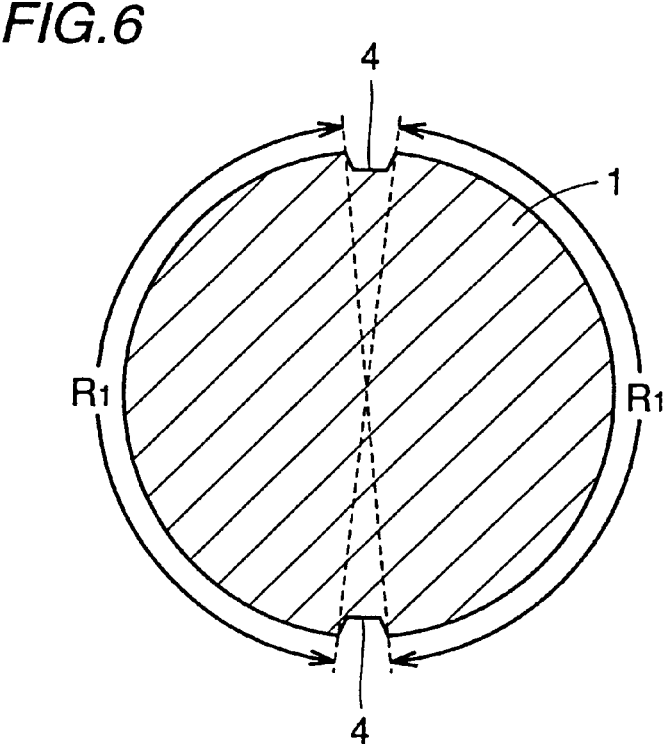
FIG. 6 shows two space enlarging portions arranged at an equal distance on the shaft body.
Figure 7:
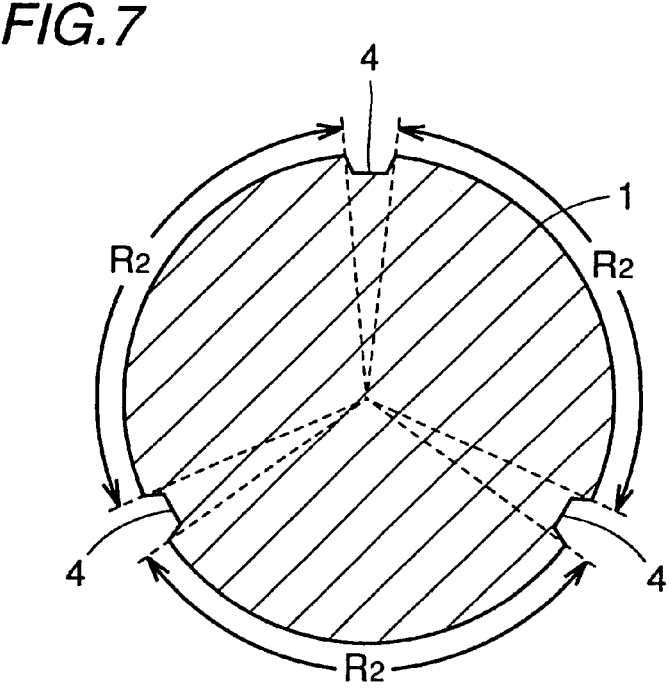
FIG. 7 shows three space enlarging portions arranged at an equal distance on the shaft body.

When a plurality of space enlarging portions 4 are provided either on shaft body 1 or bearing body 2, they should preferably be provided in the manner as shown in FIG. 6 or FIG. 7.

Referring to FIG. 6, when two space enlarging portions 4 are provided on shaft body 1, the two space enlarging portions 4 are arranged at an equal distance. More specifically, circumferential distances $R_1$ between two space enlarging portions 4 are equal to each other. Referring to FIG. 7, when three space enlarging portions 4 are provided, they are arranged such that an equal circumferential distance $R_2$ is ensured between each of the space enlarging portions 4.

The above described space enlarging portion 4 has space varying portions 41 and 42 at the inlet side and the outlet side, respectively, as shown in FIG. 4. The space variation ratio at space varying portions 41 and 42 are represented as follows, referring to FIG. 8.

Figure 8:
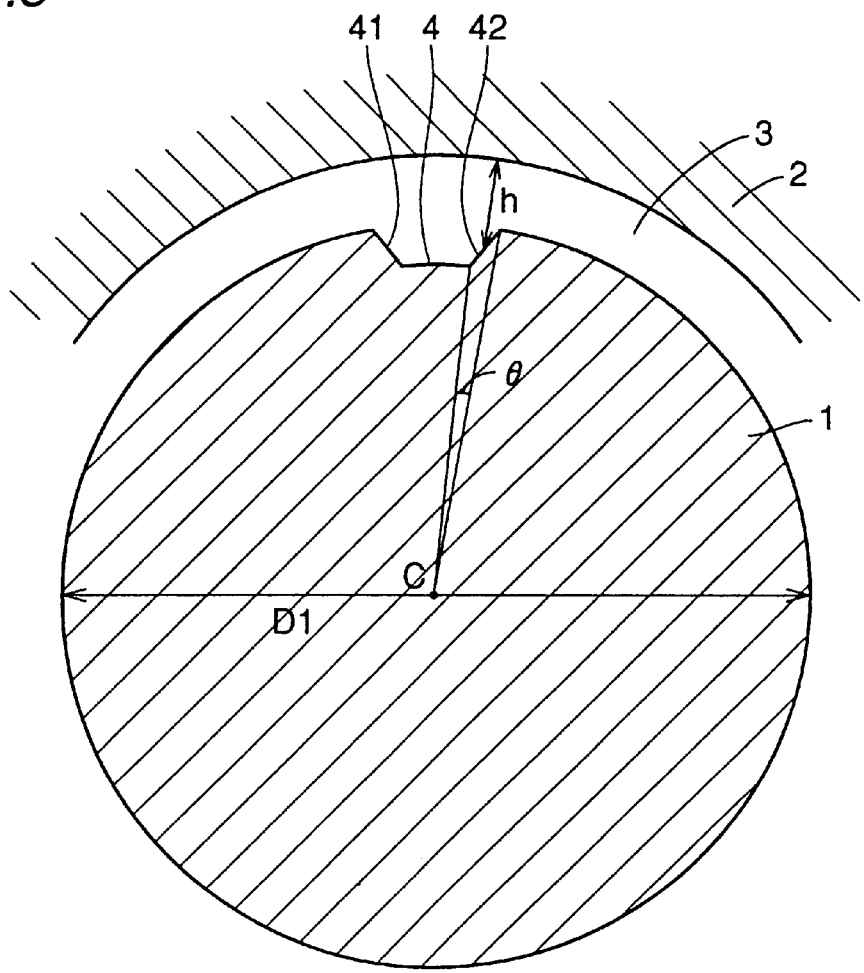
FIG. 8 is an illustration representing the space variation ratio.

Now, in FIG. 8, the space varying portion refers to that portion at which thickness h of space 3 varies with respect to central angle θ of shaft body 1, when the space enlarging portion 4 is provided on shaft body 1. The space variation ratio at the space varying portion is represented by the following equation, in which $D_1$ represents the diameter of shaft body 1, Δh represents the amount of change in thickness of space 3, and Δθ represents the amount of change of the central angle:

$\alpha = (\Delta h / D_1) / \Delta \theta \; [/°]$

When the space enlarging portion 4 is provided, it is in effect the same as when the average space is enlarged at that portion. Therefore, bearing rigidity inevitably lowers because of dynamic pressure in comparison to when there is not the space enlarging portion 4, and hence it becomes more difficult to suppress run out.

Figure 9:
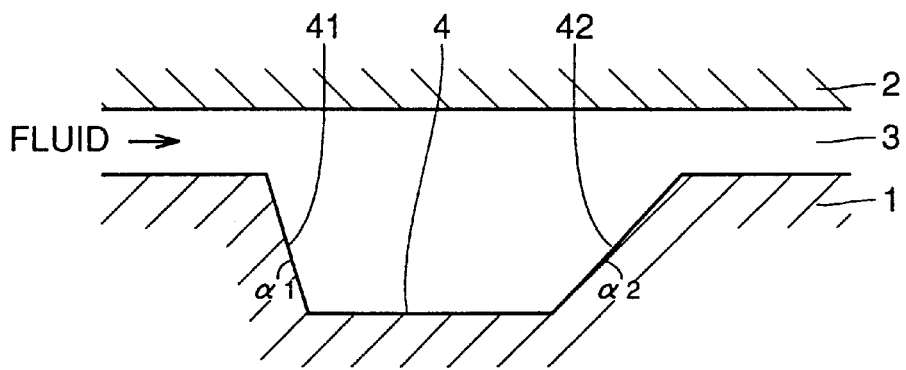
FIG. 9 is an illustration of the space enlarging portion having such a shape in that space variation ratio at the inlet side is larger than that of the outlet side.

If this problem is serious, space enlarging portion 4 should preferably be adapted to have such a shape as shown in FIG. 9. More specifically, referring to FIG. 9, with respect to the (fluid gas) flow in the peripheral direction in space 3, the space variation ratio $\alpha_1$ at space varying portion 41 in the inlet side of the fluid should preferably be made larger than the space variation ratio $\alpha_2$ of space varying portion 42 at the outlet side of the fluid. This allows suppression of run out, from the following reason.

Where the space variation ratio is large, the fluid entering the space enlarging portion 4 from the average space and flowing in the peripheral direction cannot follow the enlarging variation of space 3 and is separated from wall surface. With the space variation ratio at space varying portion 41 made large, there is provided a function of supplying air as working fluid of the bearing from the outside of the bearing space to the bearing space near the inlet portion. Meanwhile, at the outlet side with small space variation ratio, it is considered that dynamic pressure is generated because of wedge effect of the air flowing in the peripheral direction in the space 3.

Therefore, space enlarging portion 4 can be separated into a portion having the function of supplying fluid (inlet side portion) and a portion having the function of generating dynamic pressure (outlet side portion), whereby dynamic pressure can be generated effectively. It may be the case that synergistic effect of the dynamic pressure generating effect thus provided and the dynamic pressure generating effect provided by the convex polygon (FIGS. 1, 2) suppresses run out.

As the space variation ratios $\alpha_1$ and $\alpha_2$ at the inlet side and the outlet side of space enlarging portion 4 are set in this manner, the run out can be made smaller than when simply the space enlarging portion 4 is provided.

Referring to FIG. 9, at space enlarging portion 4, the ratio $(\alpha_1/\alpha_2)$ of space variation ratio $\alpha_1$ at space varying portion 41 at the inlet side with respect to space variation ratio $\alpha_2$ at space varying portion 42 at the outlet side should preferably be smaller than 10.

The reason for this is that when the ratio $(\alpha_1/\alpha_2)$ of the space variation ratios described above is 10 or more, run out becomes larger. Possible reason is that air flow in the axial direction communicated with the outside of the bearing space becomes dominant, and accordingly, pressure near the inlet portion lowers near to the atmospheric pressure, resulting in difficulty in providing the dynamic pressure effect of the bearing itself.

When the ratio $(\alpha_1/\alpha_2)$ of the space varying ratios is smaller than 10, the above described effect can appropriately be obtained, and hence run out can effectively be suppressed.

Figure 10:
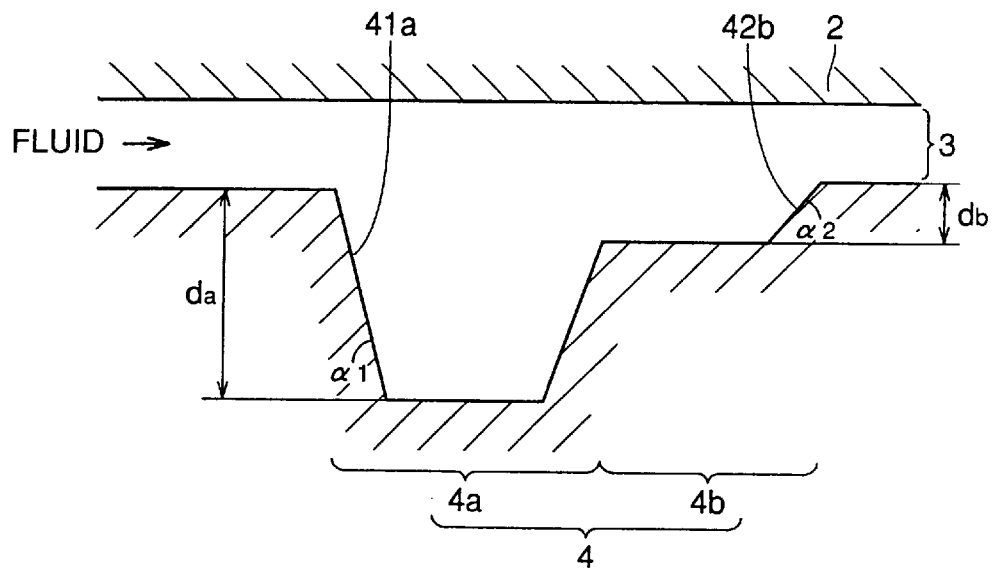
FIG. 10 shows a structure in which the space enlarging portion consists of a coupled structure of a large space portion and a small space portion.

Space enlarging portion 4 should preferably have a coupled structure of a portion 4a of larger space where the amount da of space enlargement is relatively large, and a portion 4b of smaller space where the amount db of space enlargement is relatively small, as shown in FIG. 10.

Furthermore, in this case it is preferred that with respect to the flow of the fluid in the peripheral direction of space 3, the portion 4a of larger space is positioned on the inlet side and the portion 4b of smaller space is positioned at the outlet side of the space enlarging portion 4.

It is believed that the portion 4a of larger space has the function of supplying air to the dynamic pressure generating portion as it is communicated with the outside of the bearing space, and that the portion 4b of smaller space has a function of generating dynamic pressure because of wedge effect of the air flowing in the space 3 in the peripheral direction. Therefore, space enlarging portion 4 comes to have both the working fluid supplying mechanism and the dynamic pressure generating mechanism, whereby the dynamic pressure can be generated efficiently, and hence run out can be suppressed.

In the structure shown in FIG. 10, the ratio (da/db) of the amount da of space enlargement at portion 4a of larger space with respect to the amount db of space enlargement of the portion 4b of smaller space should preferably be at most 20. When the ratio (da/db) of the amounts of space enlargement is within this range, the working fluid supplying mechanism at the portion 4a of larger space and the dynamic pressure generating mechanism at the portion 4b of smaller space can be attained appropriately, and hence run out can more effectively be suppressed.

In the structure of FIG. 10, it is preferred that the space variation ratio $\alpha_1$ at space varying portion 41a at the inlet side is larger than the space variation ratio $\alpha_2$ of the space varying portion 42b at the outlet side.

Accordingly, the synergistic effect of the working fluid supplying mechanism realized by the arrangement of the portion 4a of large space at the inlet side and the working fluid supplying mechanism realized by enlarging space variation ratio $\alpha_1$ at the inlet side, the synergistic effect of the dynamic pressure generating mechanism realized by positioning the portion 4b of smaller space at the outlet side and the dynamic pressure generating mechanism realized by making smaller the space variation ratio $\alpha_2$ at the outlet side, and the effect attained by the convex polygon are combined, thereby reducing run out.

In the structure of FIG. 10, it is preferred that the ratio $(\alpha_1/\alpha_2)$ of space variation ratio $\alpha_1$ at space varying portion 41a with respect to space varying ratio $\alpha_2$ of space varying portion 42b is smaller than 10. If the ratio $(\alpha_1/\alpha_2)$ of space variation ratios is within this range, run out in synchronization with rotation can effectively be made smaller. The reason for this may be that the working fluid supplying mechanism on the inlet side and the dynamic pressure generating mechanism on the outlet side can be attained satisfactorily.

Further, it is more preferable that the ratio $\alpha_1/\alpha_2$) of space variation ratios of smaller than 10 and the ratio (da/db) of the amounts of space enlargement not larger than 20 described above are combined in the structure shown in FIG. 10. Synergistic effect of these two can further reduce run out.

Figure 11:
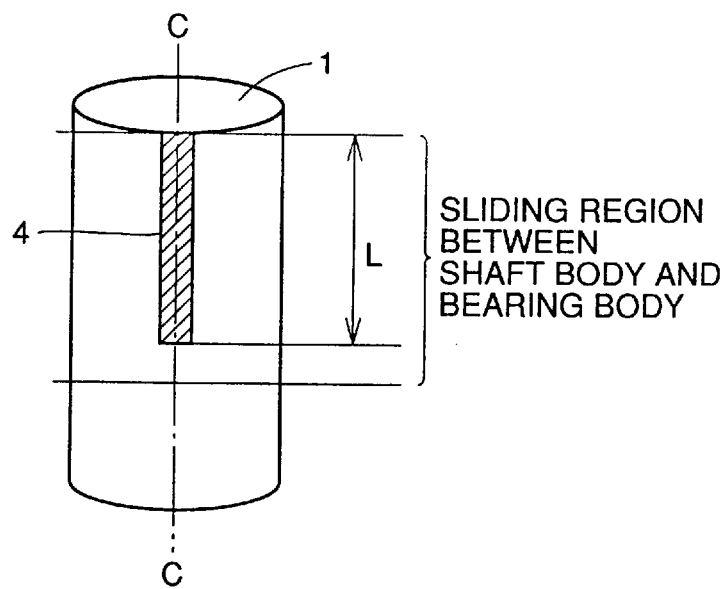
FIG. 11 is an illustration representing the length L of the space enlarging portion.

Further, the length L in the axial direction of space enlarging portion 4 should preferably be at least ⅓ of the length in the axial direction of the sliding region and more preferably, at most 2/3, as shown in FIG. 11. It is believed that by such a length, essential reduction in dynamic pressure effect by space enlarging portion 4 can be suppressed and ½ whirl can be prevented, and as a result, run out is reduced.

Examples of the present invention will be described in the following.

EXAMPLE 1

For the hydrodynamic gas bearing having such a structure as shown in FIG. 1, diameters $D_1$ and D2 of shaft body 1 and bearing body 2 are determined such that the relation h=0.000625$D_1$ is satisfied. Cross sectional shape of shaft body 1 was made perfect circle, and cross sectional shape of an inner periphery of the hollow cylinder (bearing body) 2 to be paired therewith was adapted to have a convex polygonal shape. Samples of the motor shown in FIG. 12 incorporating shaft body 1 and the bearing consisting of hollow cylinder 2 were used to measure run out and ½ whirl, when the number of vertexes of the convex polygonal shape of hollow cylinder 2 was changed and out-of-roundness of the inner periphery of hollow cylinder 2 was changed.

Figure 12:
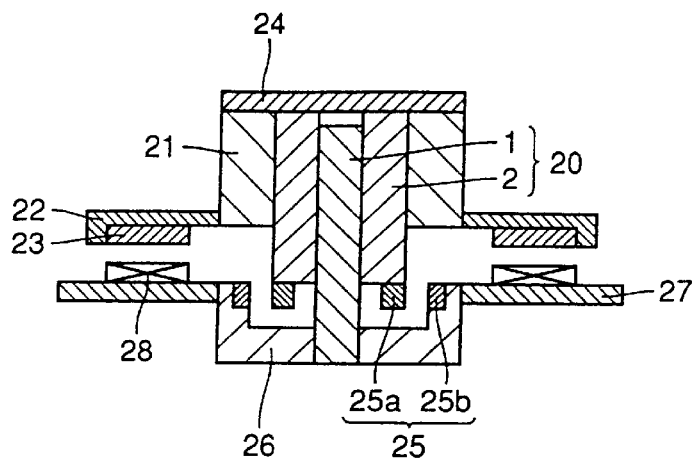
FIG. 12 is a schematic illustration of a motor structure.

The specific structure of the motor shown in FIG. 12 is as follows. Referring to FIG. 12, the motor has a shaft 1 as the shaft body and a sleeve 2 as the hollow cylinder (bearing body), with the shaft 1 and the sleeve 2 providing a radial bearing portion 20. A flange 21, a yoke 22, a rotor magnet 23 and a cap 24 are attached to sleeve 2, providing a rotor.

A base 26, a plate 27 and a driving coil 28 are attached to shaft 1, providing a stator. Driving coil 28 is attached to oppose to rotor magnet 23. On a sleeve 2 and base 26, magnets 25a and 25b constituting the axial bearing portion 25 are attached, respectively.

In the above described measurement, the motor shown in FIG. 12 was rotated at the speed of 10,000 rpm. The balance of the rotor in the motor was adjusted to attain grade G0 balance quality in accordance with JIS B0905.

Figure 13:
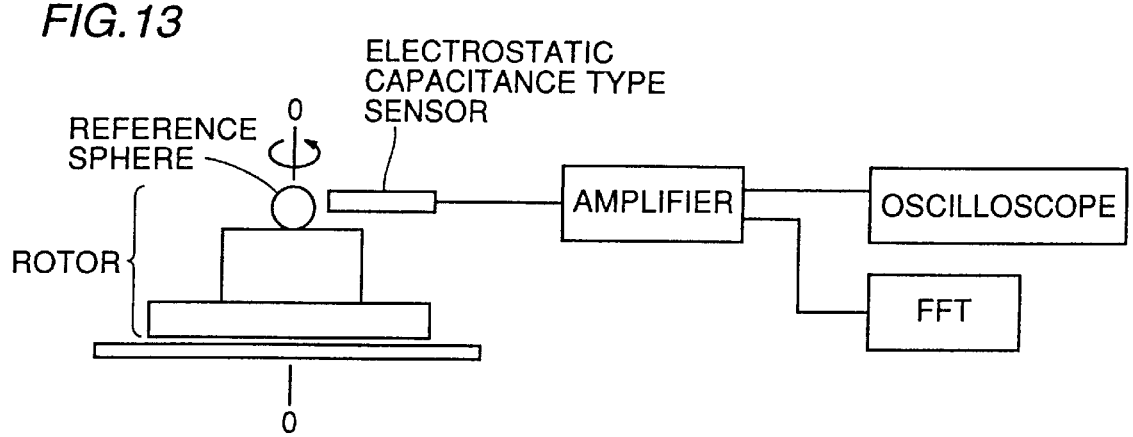
FIG. 13 is a schematic illustration showing a structure of an apparatus for measuring run out.

The measurement of run out was performed in the following manner. Referring to FIG. 13, on the rotor of the motor (FIG. 12) incorporating the bearing, a reference sphere as a reference was attached coaxially with the axis of rotation (line O—O), and run out in the radial direction of the reference sphere was measured by an electrostatic capacitance type displacement meter (electrostatic capacitance sensor).

Measurement of ½ whirl was performed in the following manner. Referring to FIG. 13, the measurement signal obtained by the electrostatic capacitance type displacement meter was amplified by an amplifier and subjected to FFT (Fast Fourier Transform) processing, and whether there was the ½ whirl or not was determined dependent on whether there was a peak at about ½ frequency of the frequency peak corresponding to the number of rotation.

The results of measurements of the run out and ½ whirl described above are as shown in Table 1.

The out-of-roundness of the inner periphery of hollow cylinder 2 was defined as follows.

Figure 14:
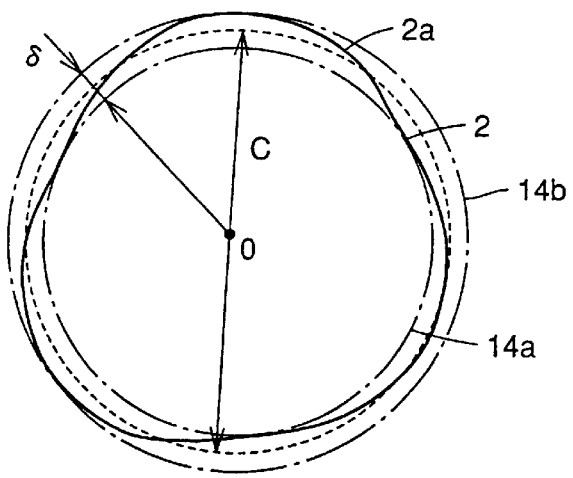
FIG. 14 is an illustration related to out-of-roundness of the hollow cylinder.

Referring to FIG. 14, the out-of-roundness of the cross sectional shape of the inner periphery of hollow cylinder 2 is represented as $\delta/C$. Where all points on a closed curve $2a$ defining the inner diameter of hollow cylinder 2 are between two virtual concentrical circles 14$a$ and 14$b$, $\delta$ represents the distance in the radial direction between the two virtual concentrical circles 14$a$ and 14$b$ when the difference in distance in the radial direction of the two virtual concentrical circles 14$a$ and 14$b$ is the smallest. Further, C represents an average value of the diameters of the two virtual concentrical circles 14$a$ and 14$b$.

Table 1 below represents the results when the out-of-roundness was $3 \times 10^{-4}$.

TABLE 1

| | Out-of-Roundness: $3 \times 10^{-4}$ | | | | | |
|---|---|---|---|---|---|---|
| Number of Vertexes | ✗3 | ✗5 | ✗8 | 10 | 20 | ✗Perfect Circle |
| Convex Polygon | X | X | X | ○ | ○ | X |
| Concave Polygon | X | X | X | X | X | — |

○:Run Out < 1 μm
X:Run Out ≥ 1 μm
✗represents comparative example

From the results of Table 1 above, it was found that when cross sectional shape of hollow cylinder 2 is a convex polygon having 10 or more vertexes, run out becomes smaller than 1 μm when out-of-roundness is $3 \times 10^{-4}$. FFT analysis of displacement signal was performed on the motor incorporating that bearing of which run out was smaller than 1 μm, and the peak representing ½ whirl was not observed.

From the results, it was found that when either one of shaft body 1 and bearing body 2 had convex polygonal cross sectional shape at the sliding surface with the number of vertexes being not smaller than 10, run out could be suppressed and ½ whirl could also be suppressed.

EXAMPLE 2

A shaft body 1 having such a structure as shown in FIGS. 1 and 4 and having a space enlarging portion 4 of such a shape that satisfies the condition of $h0=0.000625D_1$, $d=(hmax-h0)$ $D_1=0.00125D_1$, $W=60°$, $\alpha_1=\alpha_2=3.0 \times 10^{-4}/°$ formed along the axial direction in the sliding region was used. Hollow cylinder 2 to be paired with shaft body 1 was adapted to have inner peripheral cross sectional shape of convex polygon, and out-of-roundness of the inner periphery of hollow cylinder 2 was set to $3.0 \times 10^{-4}$. Samples of the motor shown in FIG. 12 were fabricated incorporating such a bearing with hollow cylinder 2 made rotatable, and run out and ½ whirl were measured with the number of vertexes of the convex polygon of hollow cylinder 2 changed and the number of space enlarging portions 4 changed.

In the measurement, the balance of the rotor was adjusted to attain the grade G0 balance quality in accordance with JIS B0905.

The motor samples were rotated at the speed of 10,000, 20,000 and 30,000 rpm, and evaluation was performed in the similar manner as in Example 1. The results are as shown in Tables 2 to 7.

Tables 2 and 3 represent results when the speed of rotation was 10,000 rpm, Tables 4 and 5 represent results when the speed of rotation was 20,000 rpm and Tables 6 and 7 represent results when the speed of rotation was 30,000 rpm.

TABLE 2

| (a) ½ whirl | | | | |
|---|---|---|---|---|
| Number of Vertexes | ✗8 | 10 | 20 | ✗Perfect Circle |
| No space enlarging portion | X | ○ | ○ | X |
| One space enlarging portion | ○ | ○ | ○ | ○ |
| Three space enlarging portions | ○ | ○ | ○ | ○ |

○:½ whirl not observed
X:½ whirl observed
✗represents comparative example

TABLE 3

| (b) Run Out | | | | |
|---|---|---|---|---|
| | | | | Unit: μm |
| Number of Vertexes | ✗8 | 10 | 20 | ✗Perfect Circle |
| No space enlarging portion | 1.20 | 0.88 | 0.86 | 3.25 |
| One space enlarging portion | 1.45 | 0.92 | 0.88 | 2.55 |
| Three space enlarging portions | 1.58 | 0.94 | 0.90 | 2.72 |

✗represents comparative example

TABLE 4

| ½ whirl | | | | |
|---|---|---|---|---|
| Number of Vertexes | ✗8 | 10 | 20 | ✗Perfect Circle |
| No space enlarging portion | X | ○ | ○ | X |
| One space enlarging portion | X | ○ | ○ | ○ |
| Three space enlarging portions | X | ○ | ○ | ○ |

○:½ whirl not observed
X:½ whirl observed
✗represents comparative example

TABLE 5

| (b) Run out | | | | |
|---|---|---|---|---|
| | | | | Unit: μm |
| Number of Vertexes | ✗8 | 10 | 20 | ✗Perfect Circle |
| No space enlarging portion | 5.20 | 0.92 | 0.90 | 5.54 |
| One space enlarging portion | 3.72 | 0.98 | 0.94 | 3.22 |
| Three space enlarging portions | 3.54 | 1.04 | 0.98 | 3.88 |

✗represents comparative example

TABLE 6

(a) ½ whirl

| Number of Vertexes | ※8 | 10 | 20 | ※Perfect Circle |
|---|---|---|---|---|
| No space enlarging portion | X | X | X | X |
| One space enlarging portion | X | ○ | ○ | ○ |
| Three space enlarging portions | X | ○ | ○ | ○ |

○:½ whirl not observed
X:½ whirl whirl observedobserved
※represents represents comparative comparative exampleexample

TABLE 7

(b) Run out

| Number of Vertexes | ※8 | 10 | 20 | Unit: μm ※Perfect Circle |
|---|---|---|---|---|
| No space enlarging portion | 5.54 | 4.84 | 4.75 | 5.70 |
| One space enlarging portion | 3.84 | 1.02 | 1.00 | 3.44 |
| Three space enlarging portions | 3.88 | 1.22 | 1.12 | 3.94 |

※represents comparative example

As can be seen from the results of Tables 2 to 7, ½ whirl could be prevented even at the high speed range of 30,000 rpm, because of the provision of space enlarging portion 4.

By the effect of space enlarging portion 4, it was possible to suppress ½ whirl even when the cross sectional shapes of both shaft body 1 and beating body 2 were perfect circles. It was found that run out could additionally be reduced when the cross sectional shape of the sliding surface of either member was adapted to have the convex polygonal shape with ten or more vertexes, as in the example of the present invention.

EXAMPLE 3

A shaft body 1 having such a structure as shown in FIGS. 1 and 4 and having the space enlarging portion 4 of such a shape that satisfies the condition of $h0=0.000625D_1$, $d=(hmax-h0)$ $D_1=0.00125D_1$ and $W=15°$ formed along the axial direction of the sliding region was used. The cross sectional shape of the inner periphery of hollow cylinder 2 to be paired with shaft body 1 was adapted to a convex polygon. Samples of the motor shown in FIG. 12 incorporating such a bearing with the hollow cylinder 2 made rotatable were fabricated, and run out was measured with the number of vertexes of the convex polygon of hollow cylinder 2 changed and space variation ratios $\alpha_1$ and $\alpha_2$ of space enlarging portion 4 changed.

The motor was rotated at the speed of 30,000 rpm. The balance of the rotor was adjusted to attain the grade G0 balance quality in accordance with JIS B0905.

Here, $\alpha_1$ represents the space variation ratio on the fluid inlet side of space enlarging portion 4 and $\alpha_2$ represents space variation ratio on the fluid outlet side of space enlarging portion 4, of FIG. 4. The results of measurement are as shown in Table 8.

TABLE 8

| Number of Vertexes | ※8 | 10 | 20 | Unit: μm ※Perfect Circle |
|---|---|---|---|---|
| $\alpha_1 = 3 \times 10^{-4}$ $\alpha_2 = 3 \times 10^{-4}$ | 5.54 | 1.22 | 1.12 | 3.94 |

TABLE 8-continued

| Number of Vertexes | ※8 | 10 | 20 | Unit: μm ※Perfect Circle |
|---|---|---|---|---|
| ※$\alpha_1 = 3 \times 10^{-4}$ $\alpha_2 = 6 \times 10^{-4}$ | 5.63 | 4.34 | 4.15 | 4.72 |
| $\alpha_1 = 6 \times 10^{-4}$ $\alpha_2 = 3 \times 10^{-4}$ | 3.66 | 1.15 | 1.04 | 3.32 |

※represents comparative example

From the results of Table 8, it was found that run out could remarkably be suppressed when space variation ratio $\alpha_1$ on the inlet side was made larger than the space variation ratio $\alpha_2$ of the outlet side, at the space enlarging portion 4.

Further, run out was studied with the ratio $\alpha_1/\alpha_2$ of $\alpha_1$ with respect to $\alpha_2$ changed, while satisfying the condition of $\alpha_1 > \alpha_2$. The study was made with $\alpha_1$ changed, while maintaining $\alpha_2$ at $3 \times 10^{-4}/°$. The results are as shown in Table 9.

TABLE 9

| Number of Vertexes | ※8 | 10 | 26 | Unit: μm ※Perfect Circle |
|---|---|---|---|---|
| $\alpha_1/\alpha_2 = 2$ | 3.66 | 1.15 | 1.04 | 3.32 |
| $\alpha_1/\alpha_2 = 5$ | 3.32 | 1.09 | 1.01 | 3.14 |
| ※$\alpha_1/\alpha_2 = 10$ | 4.20 | 2.45 | 2.34 | 3.88 |

※represents comparative example

From the results of Table 9, it was found that run out can be reduced when 0:1/t2 was set to be smaller than 10.

EXAMPLE 4

Space enlarging portion 4 provided on shaft body 1 was adapted to have such a structure in that a portion 4a of larger space and a portion 4b of smaller space were coupled as shown in FIG. 10, with the portion 4a of larger space positioned on the inlet side and the portion 4b of smaller space positioned on the outlet side. In the space enlarging portion 4, the relation between da and db was studied, where da represents the amount of space enlargement at the portion 4a of larger space and db represents the amount of space enlargement at the portion 4b of smaller space.

Space enlarging portion 4 had such a shape that satisfies the condition of $\alpha_1 = \alpha_2 = 3 \times 10^{-4}$, $W = 15°$ and $h0 = 0.000625D_1$. The inner periphery of hollow cylinder 2 to be paired with shaft body 1 was adapted to have a convex polygonal shape. Samples of the motor shown in FIG. 12 incorporating such a bearing with hollow cylinder 2 made rotatable were fabricated, and run out was measured with the values da and db changed and with the number of vertexes of the convex polygon of hollow cylinder 2 changed.

The motor was rotated at the speed of 30,000 rpm. The balance of the rotor was adjusted to attain the grade G0 balance quality in accordance with JIS B0905. The results are as shown in Table 10.

TABLE 10

| Number of Vertexes | ※8 | 10 | 20 | Unit: μm ※Perfect Circle |
|---|---|---|---|---|
| da, db = 15E = 4 × $D_1$ | 5.54 | 1.22 | 1.12 | 3.94 |
| ※da = 8E − 4 × $D_1$ | 5.65 | 4.55 | 4.43 | 4.95 |
| db = 15E − 4 × $D_1$ | 5.65 | 4.55 | 4.43 | 4.95 |

TABLE 10-continued

| Number of Vertexes | ✗8 | 10 | 20 | ✗Perfect Circle |
|---|---|---|---|---|
| da = 15E − 4 × $D_1$<br>db = 8E − 4 × $D_1$ | 3.15 | 1.08 | 0.98 | 2.86 |

Unit: μm

✗represents comparative example

From the results of Table 10, it was found that run out can remarkably be reduced when the portion 4a of larger space was positioned on the inlet side and the portion 4b of smaller space was positioned on the outlet side of space enlarging portion 4. The space enlarging portion 4 where da=db represents the one having such a shape as shown in FIG. 4.

Further, the ratio (da/db) of the amount da of space enlargement of the portion 4a of larger space with respect to the amount db of space enlargement of the portion 4b of smaller space was studied. Here, the value db was kept constant at db=8E−4×$D_1$, and run out was measured with the value da changed. The results are as shown in Table 11.

TABLE 11

| Number of Vertexes | ✗8 | 10 | 20 | ✗Perfect Circle |
|---|---|---|---|---|
| da/db = 2 | 3.15 | 1.08 | 0.98 | 2.86 |
| da/db = 5 | 2.94 | 0.99 | 0.88 | 2.23 |
| da/db = 20 | 2.75 | 0.93 | 0.86 | 2.18 |
| ✗da/db = 30 | 3.65 | 1.74 | 1.58 | 3.32 |

Unit: μm

✗represents comparative example

From the results of Table 11, it was found that run out could be reduced when the ratio (da/db) of the amounts of space enlargement was made at most 20.

EXAMPLE 5

Space enlarging portion 4 provided on shaft body 1 was adapted to have such a structure in that the portion 4a of larger space and the portion 4b of smaller space were coupled as shown in FIG. 10, with the portion 4a of larger space positioned on the inlet side and the portion 4b of smaller space positioned on the outlet side. In the space enlarging portion 4, the relation between da and db was studied, where da represents the amount of space enlargement at the portion 4a of larger space and db represents the amount of space enlargement at the portion 4b of smaller space.

The shape of space enlarging portion 4 was adapted to satisfy the conditions of W=15°, h0=0.000625$D_1$, da=0.0015$D_1$ and db=0.0008$D_1$. The inner periphery of hollow cylinder 2 to be paired with shaft body 1 was adapted to have a convex polygonal shape. Samples of the motor shown in FIG. 12 incorporating such a bearing with hollow cylinder 2 made rotatable were fabricated, and run out was measured with space variation ratios $\alpha_1$ and $\alpha_2$ of FIG. 10 changed and the number of vertexes of the convex polygon of hollow cylinder 2 changed.

The motor was rotated at the speed of 30,000 rpm, and the balance of the rotor was adjusted to attain the grade G0 balance quality in accordance with JIS B0905. The results are as shown in Table 12.

TABLE 12

| Number of Vertexes | ✗8 | 10 | 20 | ✗Perfect Circle |
|---|---|---|---|---|
| $\alpha_1$ = 3 × 10$^{-4}$<br>$\alpha_2$ = 3 × 10$^{-4}$ | 3.15 | 1.08 | 0.98 | 2.86 |
| ✗$\alpha_1$ = 3 × 10$^{-4}$<br>$\alpha_2$ = 6 × 10$^{-4}$ | 4.85 | 3.45 | 3.24 | 4.35 |
| $\alpha_1$ = 6 × 10$^{-4}$<br>$\alpha_2$ = 3 × 10$^{-4}$ | 2.95 | 1.01 | 0.92 | 2.77 |

Unit: μm

✗represents comparative example

As can be seen from the results of Table 12, run out could remarkably be reduced when $\alpha_1$ was made larger than $\alpha_2$.

Further, run out was measured when $\alpha_1$ was changed with $\alpha_2$=3×10$^{-4}$/°. The results are as shown in Table 13.

TABLE 13

| Number of Vertexes | ✗8 | 10 | 20 | ✗Perfect Circle |
|---|---|---|---|---|
| $\alpha_1/\alpha_2$ = 2 | 2.95 | 1.01 | 0.92 | 2.77 |
| $\alpha_1/\alpha_2$ = 5 | 2.80 | 0.96 | 0.86 | 2.65 |
| ✗ $\alpha_1/\alpha_2$ = 10 | 3.90 | 2.68 | 2.54 | 3.55 |

Unit: μm

✗represents comparative example

From the results of Table 13, it was found that run out could be reduced if $\alpha_1/_2$ was smaller than 10.

Further, run out was studied when the ratio da/db was changed with $\alpha_1/\alpha_2$=5. Here, db was kept constant at db=0.0003$D_1$ and da was changed. The results are as shown in Table 14.

TABLE 14

| Number of Vertexes | ✗8 | 10 | 20 | ✗Perfect Circle |
|---|---|---|---|---|
| da/db = 2 | 2.80 | 0.96 | 0.86 | 2.65 |
| da/db = 5 | 2.65 | 0.90 | 0.78 | 2.44 |
| da/db = 20 | 2.50 | 0.87 | 0.75 | 2.42 |
| ✗da/db = 30 | 4.15 | 2.87 | 2.61 | 3.94 |

Unit: μm

✗represents comparative example

As can be seen from the results of Table 14, it was found that run out could be reduced if da/db was not larger than 20.

EXAMPLE 6

The length L in the axial direction (the direction of the line C—C) of space enlarging portion 4 shown in FIG. 11 was studied. Referring to FIG. 11, upper end of space enlarging portion 4 was communicated to the outside of the sliding region between shaft body 1 and bearing body 2. Samples of shaft body 1 having the same shape as those of Example 2 except that relative length of space enlarging portion 4 with respect to axial length of the sliding region was changed were used, and the cross sectional shape of the inner periphery of hollow cylinder 2 to be paired therewith was made convex polygonal shape. Samples of the motor shown in FIG. 12 incorporating such a bearing and hollow cylinder 2 made rotatable were fabricated, and ½ whirl and run out were measured for respective cases where the aforementioned relative length and the number of vertexes of the convex polygon of hollow cylinder 2 changed.

The motor was rotated at the speed of 30,000 rpm, and the balance of the rotor was adjusted to attain the grade G0 balance quality in accordance with JIS B0905. The results are as shown in Tables 15 and 16.

TABLE 15

½ whirl

| Relative length | ☒·1/10 | ☒·¼ | ½ | ¾ | 1 |
|---|---|---|---|---|---|
| Number of vertexes = 8 | X | X | X | X | X |
| Number of vertexes = 10 | X | X | ○ | ○ | ○ |
| ☒· Perfect Circle | X | X | X | ○ | ○ |

○:½ whirl not observed
X:½ whirl observed
☒·represents comparative example

TABLE 16

Run Out

Unit: μm

| Relative length | ☒·1/10 | ¼ | ½ | ¾ | 1 |
|---|---|---|---|---|---|
| Number of vertexes = 8 | 5.12 | 4.68 | 2.98 | 3.54 | 3.88 |
| Number of vertexes = 10 | 4.02 | 1.51 | 0.98 | 1.10 | 1.22 |
| ☒· Perfect Circle | 5.31 | 4.85 | 3.66 | 3.87 | 3.94 |

☒·represents comparative example

From the results of Tables 15 and 16, it was found that when the length L of space enlarging portion 4 was set to be at least ⅓ of the length of the sliding region and the number of vertexes of the convex polygon was at least 10, ½ whirl could be suppressed and run out could be reduced.

The position of space enlarging portion 4 was studied next.

Figure 15A:
FIGS. 15A, 15B and 15C represent positions where space enlarging portions are formed, respectively.
Figure 15B:
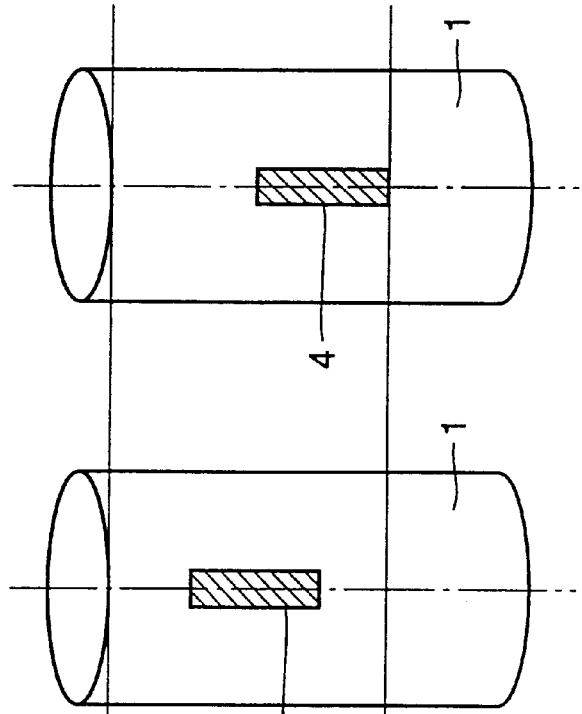
Figure 15C:
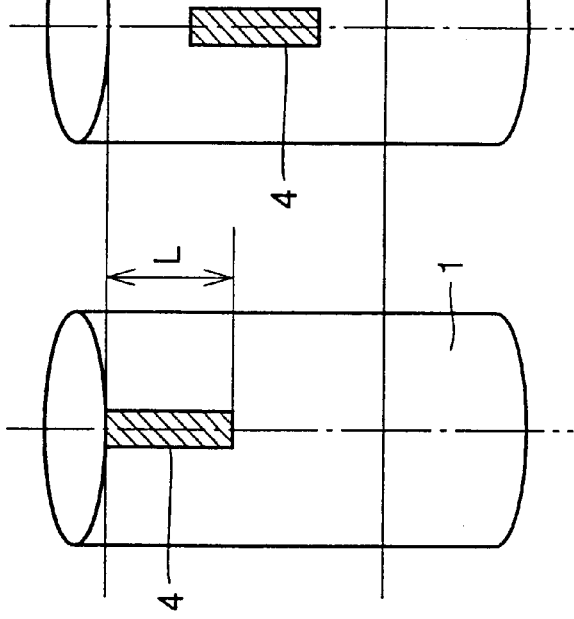

The relative length of space enlarging portion 4 with respect to the axial length of the sliding region was set to ½, and ½ whirl and the run out were measured when space enlarging portion 4 was communicated to the upper side (FIG. 15A), not communicated at all (FIG. 15B) and communicated to the lower side (FIG. 15C). The results are as shown in Table 17.

The number of vertexes of the convex polygon of hollow cylinder 2 was set to 10.

TABLE 17

Number of Vertexes = 10

| | Communicated to the upper side | Communicated to the lower side | ☒· Not communicated |
|---|---|---|---|
| ½ whirl | Not observed | Not observed | Observed |
| Run out (μm) | 0.98 | 1.01 | 3.65 |

☒·represents comparative example

From the results of Table 17, it was found that when space enlarging portion 4 was communicated to the outside of the sliding region (FIGS. 15A and 15C), ½ whirl could be eliminated and the run out could be reduced.

Though space enlarging portion 4 provided on shaft body 1 has been described in the embodiments above, similar effects can be obtained when it is provided on bearing body 2. In that case, though space enlarging portion 4 rotates together with the rotation of bearing body 2 with respect to external stationary system, there may be no essential difference.

The embodiments and examples disclosed here are examples in every aspect and should not be considered as limiting. The scope of the present invention is defined not by the descriptions above but by the claims, and modifications may be made within the spirit and the scope of the claims and equivalents thereof.

The present invention relates to a hydrodynamic gas bearing structure, and more specifically, advantageously applicable to a hydrodynamic gas bearing structure supporting a rotator rotating at a high speed.

What is claimed is:

1. A hydrodynamic gas bearing structure comprising:
a hollow bearing body with a hollow inner space therein bounded by an inner peripheral surface, and
a columnar shaft body bounded by an outer peripheral surface,
wherein said columnar shaft body and said hollow bearing body are arranged coaxially with respect to a central axis, with at least a portion of said columnar shaft body arranged within at least a portion of said hollow inner space of said hollow bearing body so that said inner peripheral surface of said hollow bearing body surrounds and is opposed to said outer peripheral surface of said columnar shaft body with a radial gap therebetween in an axial overlapping region,
wherein a first one of said columnar shaft body and said hollow bearing body has a cross-sectional shape on a section plane perpendicular to said central axis,
wherein said cross-sectional shape is defined as a convex polygon shape having at least ten major side faces and at least ten vertexes respectively between adjoining ones of said major side faces on said outer peripheral surface of said columnar shaft body or on said inner peripheral surface of said hollow bearing body respectively, and
wherein said radial gap defines an almost cylindrical space extending circumferentially around said outer peripheral surface and bounded between said outer peripheral surface and said inner peripheral surface.

2. The hydrodynamic gas bearing structure according to claim 1, wherein said convex polygon shape has at least twenty of said major side faces and at least twenty of said vertexes.

3. The hydrodynamic gas bearing structure according to claim 1, wherein said convex polygon shape has from ten to twenty of said major side faces and from ten to twenty of said vertexes.

4. The hydrodynamic gas bearing structure according to claim 1, wherein said convex polygon shape has fewer than fifty of said major side faces and fewer than fifty of said vertexes.

5. The hydrodynamic gas bearing structure according to claim 1, wherein only said first one of said columnar shaft body and said hollow bearing body has said cross-sectional shape on said section plane defined as said convex polygon shape.

6. The hydrodynamic gas bearing structure according to claim 1, wherein a second one of said columnar shaft body and said hollow bearing body other than said first one has a cross-sectional shape on said section plane defined substantially by a circle along said outer peripheral surface or said inner peripheral surface respectively.

7. The hydrodynamic gas bearing structure according to claim 6, wherein said hollow bearing body is said first one having said cross-sectional shape defined as a convex polygon shape, and said columnar shaft body is said second one having said cross-sectional shape defined substantially by a circle.

8. The hydrodynamic gas bearing structure according to claim 1, wherein a second one of said columnar shaft body and said hollow bearing body other than said first one has a depression on said peripheral surface thereof, wherein said depression extends in an axial direction parallel to said central axis and defines a space enlarging portion that enlarges a radial dimension of said almost cylindrical space in an area of said space enlarging portion in comparison to a radial dimension of said almost cylindrical space away from said space enlarging portion.

9. The hydrodynamic gas bearing structure according to claim 8, wherein at least one end portion in said axial direction of said space enlarging portion extends from said axial overlapping region to an axial non-overlapping region where said columnar shaft body and said hollow bearing body do not overlap and oppose each other.

10. The hydrodynamic gas bearing structure according to claim 8, wherein said second one of said columnar shaft body and said hollow bearing body has a plurality of said depressions forming said space enlarging portions respectively arranged at equal circumferential spacing distances from each other in said cross-sectional shape.

11. The hydrodynamic gas bearing structure according to claim 8, wherein said second one of said columnar shaft body and said hollow bearing body having said space enlarging portion is stationary with respect to an external stationary system.

12. The hydrodynamic gas bearing structure according to claim 8, wherein said second one of said columnar shaft body and said hollow bearing body having said space enlarging portion rotates with respect to an external stationary system.

13. The hydrodynamic gas bearing structure according to claim 8, wherein a space variation ratio of an inlet side of said space enlarging portion is larger than a space variation ratio of an outlet side of said space enlarging portion with respect to a gas flow in a peripheral direction in said almost cylindrical space.

14. The hydrodynamic gas bearing structure according to claim 13, wherein a ratio of said space variation ratio on said inlet side with respect to said space variation ratio on said outlet side is smaller than 10.

15. The hydrodynamic gas bearing structure according to claim 8, wherein
said space enlarging portion has a first portion of larger space where an amount of space enlargement is relatively large and a second portion of smaller space where an amount of space enlargement is relatively small,
said first portion of larger space is positioned on an inlet side of said space enlarging portion and said second portion of smaller space is positioned on an outlet side of said space enlarging portion, with respect to a gas flow in a peripheral direction in said almost cylindrical space.

16. The hydrodynamic gas bearing structure according to claim 15, wherein a ratio of an amount of space enlargement of said first portion of larger space with respect to an amount of space enlargement of said second portion of smaller space is at most 20.

17. The hydrodynamic gas bearing structure according to claim 15, wherein a first space variation ratio on said inlet side of said first portion of larger space is larger than a second space variation ratio on said outlet side of said second portion of smaller space.

18. The hydrodynamic gas bearing structure according to claim 17, wherein a ratio of said first space variation ratio with respect to said second space variation ratio is smaller than 10.

19. The hydrodynamic gas bearing structure according to claim 8, wherein a length of said space enlarging portion in said axial direction is at least $1/3$ of a length in said axial direction of said axial overlapping region.

* * * * *

UNITED STATES PATENT AND TRADEMARK OFFICE
CERTIFICATE OF CORRECTION

PATENT NO.   : 6,428,211 B1
DATED        : August 6, 2002
INVENTOR(S)  : Murabe et al.

It is certified that error appears in the above-identified patent and that said Letters Patent is hereby corrected as shown below:

<u>Column 8,</u>
Line 3, after "ration", replace "$\alpha_2$of" by -- $\alpha_2$ of --.

<u>Column 10,</u>
Line 55, following Table 4, before "comparative", replace "represonts" by
-- represents --.

<u>Column 11,</u>
Line 10, following Table 6, after "½", replace "whirl whirl observedobserved" by
-- whirl observed --;
Last line following Table 6, after "represents" (1$^{st}$ occurrence), replace "represents comparative comparative exampleexample" by -- comparative example --.

<u>Column 12,</u>
Line 16, after "ratio", replace "$\alpha_1/\alpha_2$)" by -- ($\alpha_1/\alpha_2$) --;
Line 32, after "when", replace "0:1/t2" by -- $\alpha_1/\alpha_2$ --;
Table 4, under the heading "Number of Vertexes", line 1, replace
"da, db = 15E = 4 x D$_1$" by -- da, db = 15E - 4 x D$_1$ --.

<u>Column 14,</u>
Table 13, under the heading "Number of Vertexes", line 1, replace "$\alpha_1\alpha_2$" by -- $\alpha_1/\alpha_2$ --.

Signed and Sealed this

Twenty-first Day of January, 2003

JAMES E. ROGAN
*Director of the United States Patent and Trademark Office*